Aug. 7, 1951 S. B. WILLIAMS 2,562,974
RUDDER PEDAL ADJUSTMENT
Filed Nov. 30, 1945

INVENTOR.
STERRY B. WILLIAMS
BY
ATTORNEY

Patented Aug. 7, 1951

2,562,974

UNITED STATES PATENT OFFICE 2,562,974

RUDDER PEDAL ADJUSTMENT

Sterry B. Williams, United States Navy

Application November 30, 1945, Serial No. 632,094

6 Claims. (Cl. 244—86)

(Granted under the act of March 3, 1883, as amended April 30, 1928; 370 O. G. 757)

The present invention relates to vehicle controls and has particular reference to a rudder pedal adjustment for aircraft.

In an airplane, the relationship of the positions of the rudder pedals and the pilot's seat is quite critical, and must be exactly adjusted if the pilot is to be in position for comfortable flight. Naturally the ideal spacing between the pedals and seat varies with the height of the pilot as well as habits of posture, and it follows that the plane should have some means of adjusting the distance between the pedals and the seat, in order that the pilot may assume a comfortable position.

In devices commonly used in the prior art, it has been customary to provide a separate and independent adjustment on each of the pedals. This arrangement may be satisfactory under certain conditions, but it has been shown to be very dangerous in military aircraft, since in an emerfency a pilot may be required to take off without sparing time to adjust the pedals, with the result that he will be forced to make the adjustment after he is in the air. In fact, it is even possible that he may take off in a plane in which the pedals are not equally adjusted. This is extremely dangerous with conventional adjustable pedals, since the rudder becomes fully effective only at high speed and it is entirely possible for the pilot to fail to notice the difference of adjustment between the left and right pedals until the plane has gained a dangerous speed. Then the natural tendency for the pilot to maintain the rudder pedals in parallel position during the take off may cause the plane to swerve off the runway and crash.

It is, therefore, the principal object of the present invention to provide a novel and improved rudder pedal adjustment for aircraft.

A further object of the invention resides in the provision of a rudder pedal adjusting mechanism wherein both the left and right pedals are simultaneously and equally adjusted in order that the rudder of the plane will be in a position for straight forward flight at any time that the pedals are equally depressed.

Another object resides in the provision of a single manually operable control device adapted to simultaneously adjust each of the pair of rudder pedals.

A still further object of the invention resides in the provision of an adjustable rudder pedal structure for aircraft wherein the rudder pedals are equipped with individual brake control pedals and the operation of the hydraulic brake gear is entirely independent of the adjustment of the rudder pedal position.

Further objects will appear in connection with the detailed description of the preferred form of the invention illustrated in the drawings.

Figure 1:
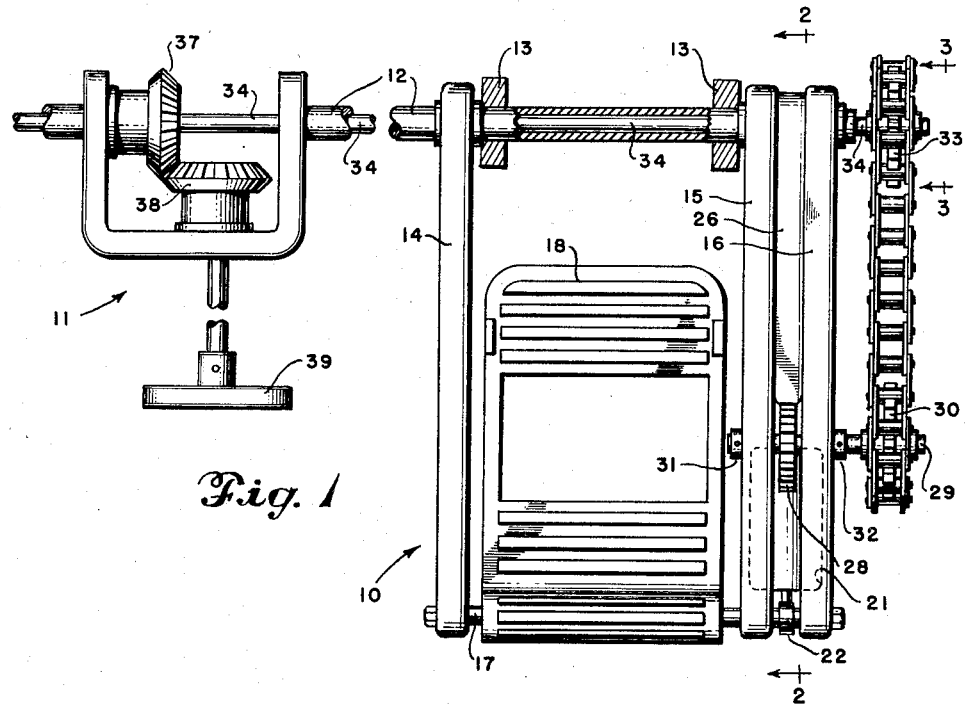
Figure 1 is a fragmental view of one rudder pedal and mount as contemplated by this disclosure, together with the central adjusting unit by which simultaneous adjustment of both rudder mounts is obtained.
Figure 2:
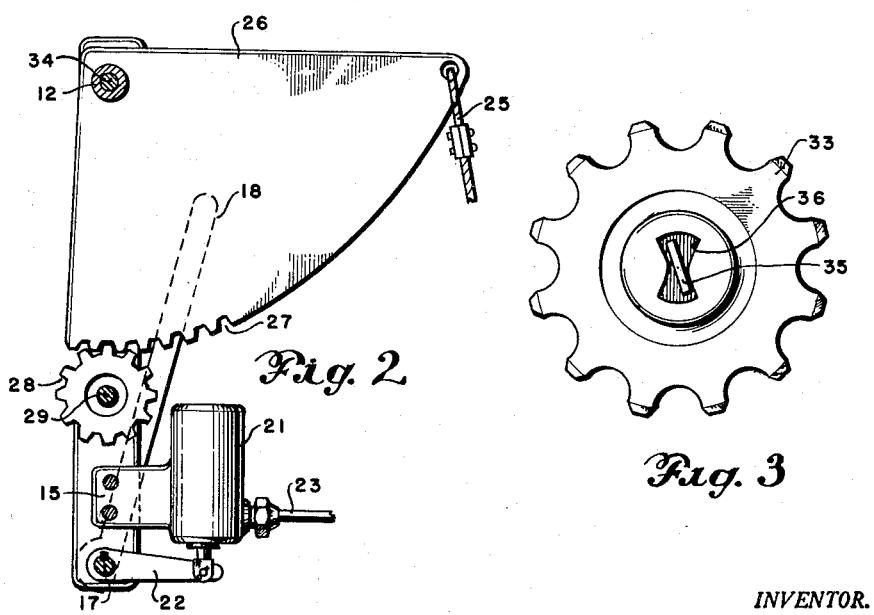
Figure 2 is a detail sectional view taken substantially on the plane of the line 2—2 in Figure 1.
Figure 3:
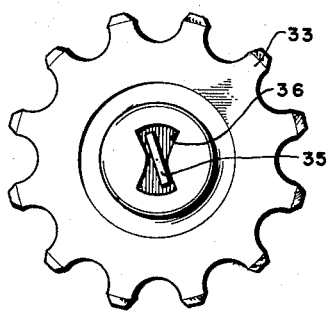
Figure 3 is a detail sectional view taken substantially on the plane of the line 3—3 in Figure 1.

In the exact form of the device shown as illustrative of the inventive principles of this disclosure, an aircraft is provided with a right-hand rudder pedal assembly generally indicated at 10, and a left-hand rudder pedal assembly, not shown, which are operatively connected and controlled by the adjusting assembly 11. The left-hand rudder assembly is identical to, but opposite of the structure shown in the right-hand assembly 10.

In each of the rudder assemblies, the entire rudder structure is pivoted on a horizontal cross tube or sleeve 12 mounted in brackets 13 fixed to the aircraft frame. The tube 12 carries three downwardly extending arms 14, 15 and 16 pivoted for free movement on the tube and drilled at their lower ends to support a pedal pivot rod 17. The rod carries a rudder pedal 18 which is fixed to the rod so that force applied at the upper end of the rudder pedal will rotate the rod 17 in its bearings and actuate a hydraulic brake cylinder 21. The piston rod of the brake cylinder is connected to a crank 22 secured to the rod 17 between the arms 15 and 16. The hydraulic brake cylinder 21 is diagrammatically illustrated and intended as representative of hydraulic brake gear. It is shown as provided with a hydraulic fluid line 23 which extends to the hydraulic system and eventually to the brake drums of the plane's landing wheels.

From examination of the mechanism as thus far described, it will be apparent that the pilot may apply foot pressure on the lower portion of the rudder ball or pedal 18 to swing the arms 14, 15 and 16 around the sleeve 12 and control the rudder of the craft and that he may simultaneously apply pressure to the upper ends of the rudder pedals to pivot around the shafts 17 and thus actuate the brake by means of the cylinder 21. It is one of the aims of this disclosure to provide means whereby both of the rudder pedals may be simultaneously and equally raised or lowered to positions nearer or further from the pilot's seat. To this end, the control cables 25, by means of which the rudder is operated, are each connected to one of a pair of plates 26 which are pivoted on the sleeve 12 between the arms 15 and 16 and act as control elements for the rudder. These plates each include a segmental gear portion 27 in mesh with a pinion gear 28 fixed on a stub shaft 29 extending through bearings 31 and 32 in the arms 15 and 16 respectively. The shaft 29 carries a sprocket 30 at its outer end and the sprocket 30 is chained to a driving sprocket 33 supported on a transverse adjusting rod 34 which extends through the tube 12 to the central adjusting yoke 11. It is to be particularly noted, however, that while the gear 28 and sprocket 30 are permanently fixed to the shaft 29, the sprocket 33 is provided with central opening 36 to provide a lost motion connection between the sprocket 33 and a flat blade portion 35 of the central adjusting rod 34.

The transverse adjusting rod 34 carries a bevel gear 37 near its mid-point and the gear 37 is in mesh with a gear 38 that may be manually rotated by the pilot by manipulation of the adjusting handle 39.

The operation of the adjusting mechanism is as follows: The pilot seats himself in the plane and places his feet on the left and right rudder pedals respectively. Assuming that the pedals are in a position too close to the pilot, he will rotate the adjusting handle 39 in a counter-clockwise direction and this motion will be transmitted to the bevel gears 38 and 37 through the adjusting rod 34 and thus through the sprocket 33 chain to the sprocket 30. The rotation of the sprocket 30 in a counter-clockwise direction will cause the pinion 28 to move to the right along the segmental gear 27 and thus swing the entire pedal structure to a position further from the seat of the plane. As this is done, both the left and right rudder pedals move simultaneously and equally; and a solenoid locking device (not shown) serves to hold any desired adjustment.

When the pilot operates the rudder pedals to control the position of the rudder, forward movement of one pedal will act through the control cables to cause an rearward movement of the opposite pedal. This motion is permitted by the lost-motion connection between the sprocket 33 and the adjusting rod 34.

From the foregoing, it will be apparent that by practicing the teachings of the present invention it is possible to provide for simultaneous and equal adjustment of both the left and right-hand rudder pedals of an aircraft. More important, the structure shown and disclosed in the drawings makes any necessary degree of adjustment in such a manner that the rudder pedals are operatively connected to the rudder throughout the adjusting process as well as after the adjustment is completed, so that the rudder is always under positive control of the rudder pedals. Moreover, the rudder pedal adjustment may be accomplished by hand while the pilot keeps both feet on the rudder pedals and maintains positive control of the rudder position and the wheel brakes, so that if the pilot finds it necessary, he may easily make an adjustment of the rudder position while taxying or when in the air.

While I have shown and described what is believed to be the present preferred structure of the invention, numerous modifications and variations will become apparent to those skilled in the art and it is accordingly requested that the scope of this invention be regarded as limited only by the terms of the appended claims.

The invention, if patented, may be manufactured and used by or for the Government for governmental purposes without the payment to me of any royalty thereon.

Having thus described the invention, what I claim as new and desire to secure by United States Letters Patent is:

1. In an airplane having a rudder and control cables for the rudder, a pair of rudder pedal assemblies each including a top pivot, downwardly extending arms, a pivot at the lower end of these arms and a foot pedal carried by the lower pivot, a brake control device actuated by movement of the pedal on the lower pivot, a rudder control element secured to each of the pedal assemblies and connected to the control cables of the rudder, means comprising a segmental gear and a pinion, to shift the relative position of each pedal assembly and control element, together with adjusting means common to both of the pedal assemblies and including a rotatable shaft with a chain and sprocket connection between the shaft and the aforementioned pinions, means for rotating the shaft to simultaneously adjust both rudder pedals, and a lost motion connection between the shaft and the adjusting pinions.

2. In an airplane having a rudder and control cables for the rudder, a transversely mounted rotatable shaft, a pair of rudder pedal assemblies each pivotable at their upper portion and each assembly including a top pivot about said shaft, downwardly extending arms, a foot pedal at the lower end of the arms, and a rudder control element shiftably secured to each of the pedal assemblies and connected to the control cables of the rudder, means to shift the relative position of each pedal assembly and its control element, adjusting means common to both of the pedal assemblies for operating said shifting means, the adjusting means including said rotatable shaft and a single handle for operating the shaft to simultaneously adjust both rudder pedal assemblies.

3. In an airplane having a rudder and control cables for the rudder, a transversely mounted rotatable shaft, a pair of rudder pedal assemblies swung from horizontal pivots on said shaft, each including a foot pedal, rudder control elements shiftably secured to each of the pedal assemblies and connected to the control cables of the rudder, means to shift the relative position of each pedal assembly and its control element, adjusting means common to both of the pedal assemblies for operating said shifting means and including said shaft and a single manually operable handle adapted to simultaneously adjust both pedal assemblies.

4. In an airplane having a pilot's seat, a rudder and control cables for the rudder, a pair of rudder pedal assemblies swung from horizontal pivots, each including a foot pedal, a rudder control element secured to each of the pedal assemblies and connected to the control cables of the rudder, means to shift the relative position of each pedal assembly and control element comprising an adjusting handle, a gear mounted on each control element and a pinion mounted on each pedal assembly and meshed with the corresponding gear, a chain and sprocket connection between the adjusting handle and each pinion.

5. In an airplane having a pilot's seat, a rudder and control cables for the rudder, a pair of rudder pedal assemblies each including a top pivot and downwardly extending arms, a pivot at the lower end of these arms and a foot pedal carried by the lower pivot, a brake control device actuated by movement of the pedal on the lower pivot, a rudder control element shiftably secured to each of the pedal assemblies and connected to the control cables of the rudder, means to shift the relative position of each pedal assembly and its corresponding control element, said means comprising a segmental gear on the control element and a pinion carried by the downwardly extending arms for engagement with the segmental gear, and a manual control for simultaneously operating both shifting means to adjust the distance of the foot pedals from the pilot's seat.

6. In an airplane having a rudder and control cables for the rudder, a pair of rudder pedal assemblies, each including a top pivot, downwardly extending arms, and a foot pedal carried by the arms, a rudder control element secured to each of the pedal assemblies and connected to the control cables of the rudder, means to shift the relative position of each pedal assembly and control element comprising a segmental gear and a pinion, together with adjusting means common to both of the pedal assemblies and including a rotatable shaft with a chain and sprocket connection between the shaft and the aforementioned pinions, together with means for rotating the shaft to simultaneously adjust both rudder pedals.

STERRY B. WILLIAMS.

REFERENCES CITED

The following references are of record in the file of this patent:

UNITED STATES PATENTS

| Number | Name | Date |
|---|---|---|
| 1,902,094 | Page | Mar. 21, 1933 |
| 2,048,448 | Hofer | July 21, 1936 |
| 2,134,509 | Frank | Oct. 25, 1938 |
| 2,220,194 | Albright | Nov. 5, 1940 |

FOREIGN PATENTS

| Number | Country | Date |
|---|---|---|
| 330,634 | Great Britain | June 16, 1930 |
| 561,813 | Great Britain | June 6, 1944 |
| 668,292 | Germany | Nov. 30, 1938 |